United States Patent
Schröder

(10) Patent No.: US 8,485,118 B2
(45) Date of Patent: *Jul. 16, 2013

(54) SUBMARINE WITH A PROPULSION DRIVE WITH AN ELECTRIC MOTOR RING

(75) Inventor: Dierk Schröder, Selent (DE)

(73) Assignee: Siemens Aktiengesellschaft, München (DE)

( * ) Notice: Subject to any disclaimer, the term of this patent is extended or adjusted under 35 U.S.C. 154(b) by 15 days.

This patent is subject to a terminal disclaimer.

(21) Appl. No.: 13/267,083

(22) Filed: Oct. 6, 2011

(65) Prior Publication Data

US 2012/0024216 A1     Feb. 2, 2012

Related U.S. Application Data

(63) Continuation of application No. 12/470,512, filed on May 22, 2009, now Pat. No. 8,074,592.

(60) Provisional application No. 61/116,652, filed on Nov. 21, 2008.

(30) Foreign Application Priority Data

May 27, 2008   (DE) .......................... 10 2008 025 211

(51) Int. Cl.
    *B63G 8/08*     (2006.01)
(52) U.S. Cl.
    USPC .............................................. 114/338; 440/6

(58) Field of Classification Search
    USPC ....................................... 114/337, 338; 440/6
    See application file for complete search history.

(56) References Cited

U.S. PATENT DOCUMENTS

| 5,185,545 | A  | * | 2/1993  | Veronesi et al. ............. 310/114 |
| 5,220,231 | A  |   | 6/1993  | Bergmark |
| 5,306,183 | A  | * | 4/1994  | Holt et al. ........................ 440/6 |
| 7,032,859 | B2 | * | 4/2006  | Mohr ........................... 244/12.2 |
| 8,074,592 | B2 | * | 12/2011 | Schroder ...................... 114/338 |
| 2011/0074158 | A1 |   | 3/2011  | Schroeder |

FOREIGN PATENT DOCUMENTS

| KR | 100308180 B1 | 11/1993 |
| KR | 100308181 B1 | 11/1993 |

* cited by examiner

*Primary Examiner* — Stephen Avila

(57) ABSTRACT

In one aspect, a submarine with a boat hull and a propulsion drive for the submarine the propulsion drive is arranged outside the boat hull and comprises a housing and a first electric motor, with the housing embodying a channel for a flow of water through the channel in a main direction of flow from an inlet to an outlet of the channel, and with the first electric motor featuring a rotor which is arranged in the channel and is supported rotatably around an axis of rotation in the housing, with the rotor being embodied in the shape of a ring with a ring inner side and a ring outer side, and with blades for propelling the submarine being arranged on the ring inner side of the rotor.

12 Claims, 4 Drawing Sheets

SUBMARINE WITH A PROPULSION DRIVE WITH AN ELECTRIC MOTOR RING

CROSS REFERENCE TO RELATED APPLICATIONS

The present application is a continuation of U.S. Ser. No. 12/470,512 filed on May 22, and claims the benefit thereof, 2009, to the provisional patent application filed on Nov. 21, 2008, and assigned application No. 61/116,652, and to the German application No. 10 2008 025 211.5 DE filed May 27, 2008. All of the priority applications are incorporated by reference herein in their entirety.

FIELD OF INVENTION

The invention relates to a submarine with a propulsion drive with an electric ring motor.

BACKGROUND OF INVENTION

Current manned military submarines usually have an electric motor arranged in the submarine as their propulsion drive, which via a propeller shaft drives a propeller arranged in a longitudinal direction outside the hull of the boat as an extension of the stern. To this end the propeller shaft must penetrate the hull of the submarine in the submarine's stern. The sealing at the point of penetration is provided in such cases by a shaft sealing ring. With some types of submarine two propeller shafts can also be fed in the stern through the boat hull and via a propeller shaft (one propeller each on the starboard side and on the port side) drive two propellers arranged outside the hull of the boat in a longitudinal direction as an extension of the stern.

SUMMARY OF INVENTION

A disadvantage with this type of propulsion drive is the relatively large noise radiation of the propeller which makes it easier to locate the submarine. In addition at great depths even a small amount of damage to the shaft seal can lead to problems for the submarine. Furthermore a torpedo hit or other damage to the stern of the submarine when the propeller shaft is turning can lead to the shaft bending and thereby to the stern of the submarine being ripped off in such a way that the result is a total loss of the submarine.

The object of the present invention is therefore to specify a submarine with a propulsion drive with which the above problems can be at least partly avoided.

This object is successfully achieved by a submarine with a propulsion drive and a method as claimed in the independent claims. Advantageous embodiments of the submarine and method are the subject matter of dependent claims.

An inventive submarine features a propulsion drive arranged outside the boat hull which is arranged in the longitudinal direction of the submarine as an extension of its stern and comprises a housing and a first electric motor. The housing forms a preferably nozzle-shaped channel for a flow of water through the channel in a main direction of flow from an inlet to an outlet of the channel. The first electric motor features a rotor which is arranged in the channel and is supported rotatably in the housing, with the motor being embodied in a ring shape with a ring inner side and a ring outer side. Inventively blades to propel the submarine are arranged on the ring inner side of the rotor. An electric motor with such a ring-shaped rotor is frequently referred to in the technical literature as an "electric ring motor" or "RIM drive".

Since the electric motor is arranged outside the boat hull, only cables for supplying power to the electric ring motor have to be fed through the hull at any chosen point. No penetration through the boat hull by a rotating propeller shaft is needed however. This means that on the one hand no problems with shaft sealing can arise and on the other hand a torpedo hit in the stern of the submarine is highly unlikely to lead to a total loss of the submarine. Since the rotor is surrounded by a housing, the noise radiation of the rotor and of the propeller blades for propelling the submarine can be kept small. The noise developed by the propeller blades is above all lower however since the design means that no peak eddies arise on the outer edges of the blades. The ring-shaped embodiment of the rotor means that the flow area for the water can be designed with especially low resistance and to promote the flow. Since the electric motor is arranged outside the boat hull, it also requires no space within the boat hull. In the event of a torpedo hit in the stern of the submarine the propulsion drive even represents a further mass which absorbs a part of the explosion.

In accordance with an especially advantageous embodiment the propulsion drive additionally features at least one second electric motor with a rotor which is likewise arranged in the channel and is supported rotatably in the housing, with the rotor being embodied in a ring shape with a ring inner side and a ring outer side, with blades being embodied on the ring inner side of the rotor and with the rotor of the first electric motor and the rotor of the second electric motor being arranged in the channel in the main direction of flow of the water behind one another. The second electric motor is thus also embodied as a "RIM drive" or electric ring motor. Such a propulsion drive is redundant to a large extent and has a high level of failsafe characteristics. In addition the maximum drive power can be increased without reducing the effectiveness during silent running, which has a positive affect on the dive time.

Preferably the rotor of the second motor is able to be turned independently of the rotor of the first motor in order to divert a flow of the water caused by the rotor of the first motor which deviates from the main direction of flow back into the main direction of flow. The rotors of the electric motors are preferably supported here in an opposing direction to each other rotatably in the housing. The rotor of the first electric motor arranged first in the direction of flow can thus be controlled explicitly to impart a torque to the water for propelling the submarine. Through the rotor of the second motor the loss-impaired spin of the outflow of the rotor of the first motor, i.e. flow components of the water which deviate from the main direction of flow can be diverted at the least in part back into the main direction of flow and thus converted into impetus. If the main direction of flow runs in the direction of the axis of rotation of the rotor the flow components deviating from the main direction of flow can for example involve radial or circular flow components in relation to the axis of rotation. A flow diversion and an at least partial torque compensation is thus effected by the second rotor. A diversion of the flow components of the water deviating from the main direction of flow is possible by the second rotor being simply held stationary so that it is driven by the water flowing through the channel and if necessary electrically in addition with a low torque or that it is driven electrically contrarotationally.

The support of the rotors in the housing and the torque compensation which leads to a reduction of the blade loading on full load of the blades arranged on the rotors for driving the submarine means that the noise emitted by the propulsion drive into the environment can be kept low and also the cavitation on the blades can be reduced. This also facilitates the task of hydrodynamic design.

By controlling the torque output by the rotor of the second motor to the water, flow components generated by the rotor of the first motor in the outflow of the first rotor deviating from the main direction of flow can be explicitly diverted at least partly back into the main direction of flow. The control can for example be undertaken as a function of the general hydrodynamic conditions and the concrete design of the propulsion drive. An optimum equalization of the torque between the motors enables the water flow to then be used to the optimum effect. This increases the efficiency and thereby the service life.

The propulsion drive can basically also comprise more than two motors with rotors which are arranged in the channel in the main direction of flow of the fluid behind one another. With this type of linkage of motors a few rotors can be explicitly used for torque output and others for equalizing the torque and be operated in the corresponding manner during operation. The propulsion drive in such cases, depending on the power requirement and/or general fluidic conditions, can be constructed in a modular fashion from a plurality of standardized motor units, with the number of motor units being able to be an even number or also an odd number.

In accordance with an especially advantageous embodiment of the invention the torque outputs of the motors are able to be controlled independently of one another. This makes it possible to adapt the propulsion drive to different fluidic framework conditions and to explicitly set a desired mode of operation of the propulsion drive (e.g. thrust-optimized, speed optimized, consumption-optimized, noise-optimized).

Advantageously the submarine includes a control device for controlling the torque emissions of the motor such that the torques output by the motors are in a predetermined relationship to each other. Such torque relationships can typically be stored as a function of the general fluidic conditions such as the flow speed of the fluid or other parameters for example (such as the desired operating mode for example) in the form of characteristic curves in the control device.

The control device can control the relationship of the torques controlling or regulating the flow strengths which are applied to the motors. To control the torque outputs each of the motors can be connected for current feed electrically with a current converter in each case. By means of a current converter the current fed to an electrical machine and thus the torque output by the electrical machine can be controlled in a simple and reliable way.

Preferably the relationship of the torques output is able to be changed during operation of the propulsion drive. The propulsion drive can thus be adapted in the optimum way to the general fluidic conditions or to a desired operating mode obtaining during operation in each case.

The ring-shaped embodiment of the rotor (of the rotors) means that it is especially advantageously possible, with the rotor (the rotors), to dispense with a (central) shaft and with the supports necessary for said shaft, which are especially disruptive for the water flowing through the channel and reduce the efficiency of the propulsion drive. The motor (the motors) is (are) therefore free of a component which runs along the axis of rotation of the (of their respective) rotor through the latter. Dispensing with a central shaft also has the advantage that it is difficult for foreign bodies entering into the channel to become wedged.

The ring-shaped embodiment of the rotor (of the rotors) however also makes it possible for a central rotation-symmetric displacement body to be provided for the rotor (the rotors) which runs along the axis of rotation of the (of its respective) rotor through the latter and is optimized to the wake of the boat.

If the housing is embodied in the shape of a nozzle an especially high efficiency of the propulsion drive can be achieved. This type of nozzle-shaped design allows, especially with standard thrust conditions, a higher thrust to be achieved than with a freely turning propeller, which increases maneuverability in tight situations.

This applies especially when the housing of the propulsion drive is attached, by means of a suitable attachment for example) horizontally and/or vertically in relation to the boat hull, movably to the boat hull, since the thrust flow can then be directed in different directions. This even allows the rear control rudders on a submarine to be dispensed with or at the least greatly reduced in size, which also serves to minimize resistance and thus to increase power and reduce noise emissions.

Usually with a submarine the hull of the boat mostly runs at its rear end seen in the direction of flow into a rounded stern section, frequently referred to in technical jargon as the "stern cone". In accordance with an especially advantageous embodiment the submarine contains precisely one propulsion drive described above, with the stern cone in the direction of flow being arranged in front of the inlet of the propulsion drive.

The stern cone in such cases is arranged in a line with the axis of rotation of the rotor or of the rotors, i.e. the end of the stern cone lies precisely on the axis of rotation of the rotor or the rotors of the propulsion drive respectively. The stern cone can however also be arranged at a distance from this axis of rotation, with this distance then preferably being smaller than the distance of the ring inner side of the rotor or of the rotors from the axis of rotation, in order to obtain an even flow onto the propulsion drive.

The stern cone can also extend into the propulsion drive or can extend through the propulsion drive. The stern cone is then preferably arranged in a line with the axis of rotation of the rotor or of the rotors of the propulsion drive. Preferably the stern cone in such cases is symmetrical to the axis, with its axis of symmetry running in a line with the axis of rotation of the rotor or of the rotors. The ends of the blades of the rotor or of the rotors in such cases can also be supported to rotate on the stern cone, which enables the stability and thereby the power output of the propulsion drive to be increased. Alternately the ends of the blades can also be rigidly attached to the stern cone and the stern cone attached rotatably to the hull of the boat for this purpose.

The size of the propulsion drive, its arrangement on the stern cone and the shape of the stern of the submarine, especially the shape of the stern cone, are in such cases preferably matched to one another such that an even flow onto the propulsion drive is produced, through which a good efficiency of the propulsion drive is achieved and even cavitation and undesired noise scan be avoided. Such system optimization is possible for the person skilled in the art without any great difficulties.

Basically a submarine can naturally also feature two of the propulsion drives described above, which for example are arranged next to each other in the longitudinal direction of the submarine as an extension of the stern outside the boat hull (e.g. one each on the starboard and the port side).

An especially advantageous method of operating a propulsion drive described above with two electric motors is characterized in that a flow of the water caused by the rotor of the first motor which deviates from the main direction of flow is diverted by the rotor of the second motor at least partly back into the main direction of flow.

In this case the following advantageous modes of operation are provided:

a) The rotor of the first motor is driven electrically and the rotor of the second motor is kept stationary. This operating mode is preferably suitable for silent running of the submarine.

b) The rotor of the first motor is electrically driven and the rotor of the second motor is driven entirely or at least essentially by the water flowing in the channel. The rotor of the second motor can then assume the function of a so-called Grim's guide wheel, which diverts the flow components deviating from the main direction of flow and thereby subject to losses of the outflow of the first rotor at least partly back into the main direction of flow. This operating mode is preferably suitable for when the submarine is traveling at cruising speed. If necessary this movement is also supported by a small torque which is supplied by the second motor, e.g. when the second rotor with its blades is not designed as a Grim's guide wheel.

c) the rotors of both motors are electrically driven, with the two rotors contrarotating. This operating mode is especially advantageous for traveling at high speed and/or at great depth since here a marked increase in efficiency (around 3%) is to be expected.

BRIEF DESCRIPTION OF THE DRAWINGS

The invention as well as further advantageous embodiments of the invention in accordance with features of the subclaims are explained in greater detail below on the basis of exemplary embodiments in the figures. The figures show:

DETAILED DESCRIPTION OF INVENTION

Figure 1:
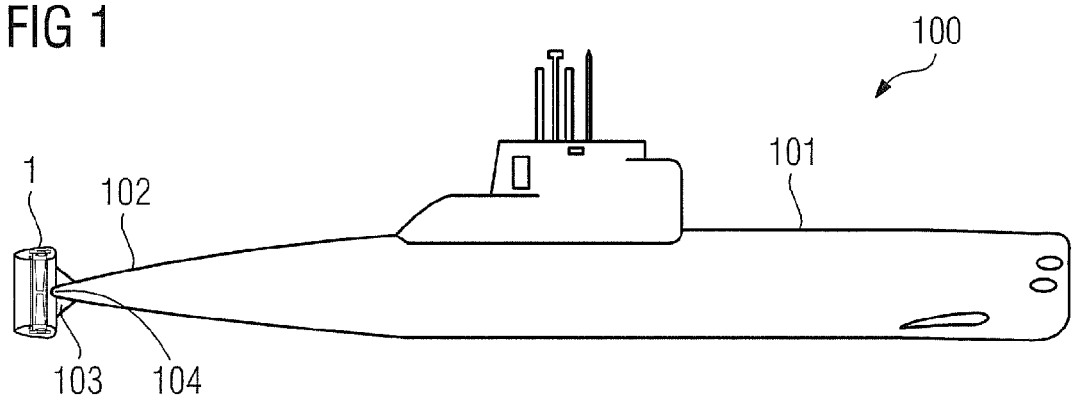
FIG. 1 a submarine with a propulsion drive with a single electric ring motor.

FIG. 1 shows in a basic diagram a manned military submarine 100 with a boat hull and a propulsion drive 1 arranged at the stern 102 of the submarine 100. The propulsion drive 1 in this case represents the main propulsion drive of the submarine. The propulsion drive 1 is arranged in the longitudinal direction of the submarine 100 as an extension of the stern outside the boat hull 101. The propulsion drive 1 is attached to the boat hull 101 by means of holders 103. Basically a submarine can also have two or more of such propulsion drives 1 as its main propulsion drive, which are arranged in the longitudinal direction of the submarine 100 as an extension of the stern 102 outside the boat hull 101 (e.g. one each on the starboard and port side).

Figure 2:
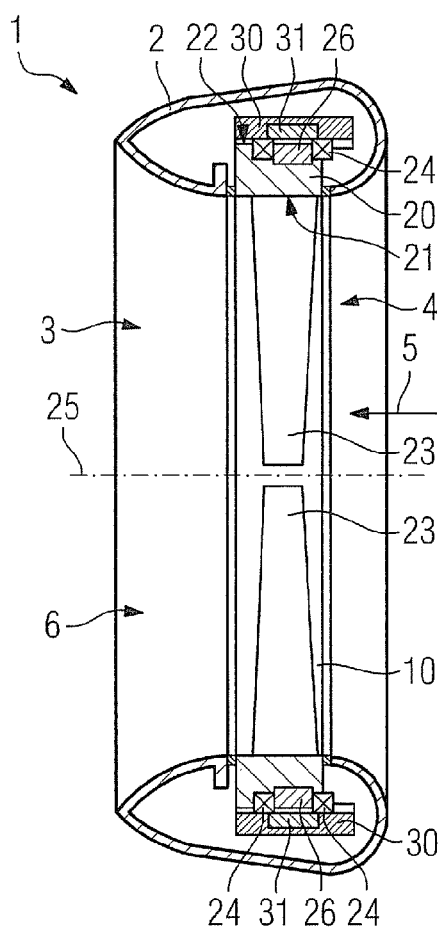
FIG. 2 a part longitudinal section through the propulsion drive of FIG. 1.

As shown in detail in FIG. 2, the main propulsion unit 1 features a housing 2 embodied in the shape of a nozzle, which forms a tubular channel 3 for a flow of water through the channel 3 in a main direction of flow 5 from an inlet 4 to an outlet 6 of the channel 3.

The propulsion drive 1 comprises an electric motor 10 with a rotor 20, which is arranged in the channel and 3 and supported rotatably around an axis of rotation 25 in the housing 2, with the rotor 20 being embodied as a hollow cylinder and thus in the shape of ring with a ring inner side 21 and a ring outer side 22. Evenly distributed on the ring inner side 21 of the rotor 20 in the circumferential direction are blades 23 for propelling the submarine 100. The ring outer side 22 is understood in this case to be these side of the rotor 20 which is defined by the radial outer delimiting surface of the rotor 20 and the ring inner side 21 is understood as the side of the rotor which is defined by the radial inner delimiting surface of the rotor 20. The main direction of flow 5 runs in this case in the direction of the axis of rotation 25 of the rotor 20.

The rotor 20 is supported on its ring outer side to 22 by means of bearings 24 rotatably in the housing 2 around the axis of rotation 25. The support can however basically also be provided by bearings on the ring inner side 21 or on one or both end faces of the ring-shaped rotor 20.

The blades 23 directed inwards in the direction of the axis of rotation 25 on the ring inner side 21 of the rotor 20 rotate with the rotor 20 and are preferably attached in standardized attachment apparatus detachably to the rotor 20 to enable them to be replaced. The blades 23 can typically have an axial, half-axial or radial shape here. The rotor 20, along with the blades 23 attached to it, therefore forms an impeller. Arranged on the ring outer side of the rotor 20 is an exciter system 26. This can involve an arrangement of permanent magnets or a winding system which is arranged in the circumferential direction of the rotor 20 distributed on its ring outer side 22.

The motor 10 further comprises a stator 30 with a stator-side exciter system 31, with the stator 30 being arranged in the form of a ring around the rotor 20 so that the stator-side exciter system 31 and the rotor-side exciter system 26 interact electromagnetically so that the stator 30 with the rotor 20 forms the electric motor 10. Such an electric motor 10 with a ring-shaped rotor 20 is often referred to in technical literature as a "RIM drive" or as an electric ring motor.

The cables for supplying power to the motor 10 as well as signal lines for the control and regulation as well as monitoring of the motor 10 can for example run in the holders 103.

The propulsion drive 1 is embodied to provide an especially low resistance for the water flowing through the channel 3. To this end the motor 10 is free from a component which runs through it along the axis of rotation 25 of its rotor 20. In addition the stator 30 is integrated into the housing 2. Furthermore the ring-shaped rotor 20 is embodied such that the diameter of the ring inner side 21 corresponds to the diameter of the channel 3 immediately in front of the rotor 20. The ring-shaped rotor 20 is arranged sunken into the housing 2 for this purpose or with its ring inner side 21 forms the outer delimiting surface of the channel 3 in the area of the rotor 20, with the outer delimiting surface being flush with the adjoining outer delimiting surface formed by the housing 2. The ring-shaped rotor 20 itself thus does not represent any resistance to the flow for the water above and beyond the friction on the wall.

Figure 3:
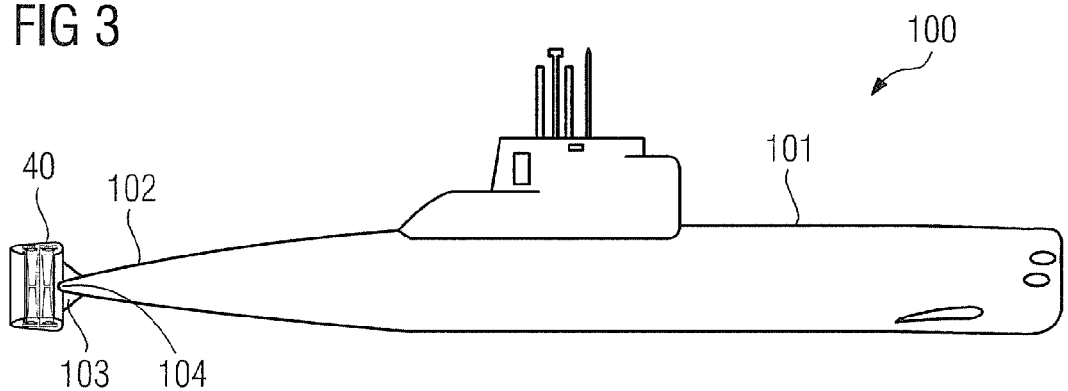
FIG. 3 a submarine with a propulsion drive with two electric ring motors.

A submarine 100 shown in FIG. 3 differs from the submarine shown in FIG. 1 in that it features a propulsion drive 40 which, instead of only one single motor 10, now features two motors 10, 11.

Figure 4:
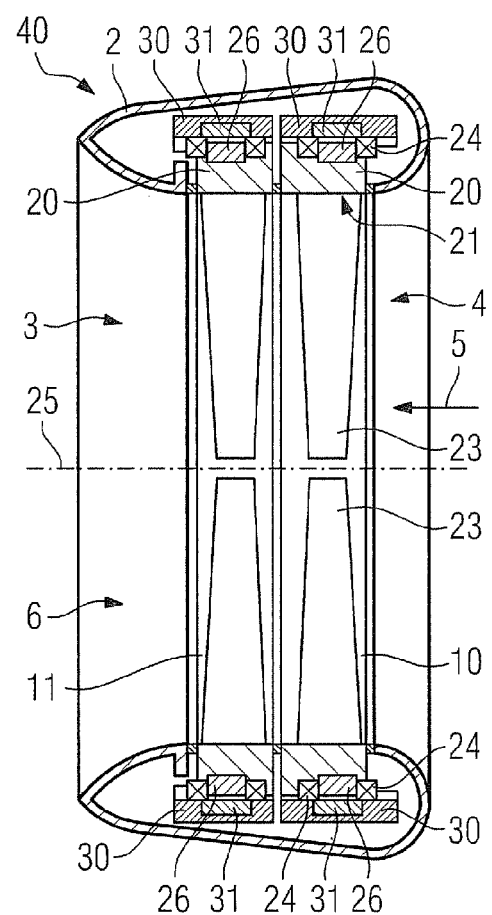
FIG. 4 a part longitudinal section through the propulsion drive of FIG. 3.

As shown in detail in FIG. 4, each of the motors 10, 11 features a rotor 20 which is embodied as a hollow cylinder and thus in the shape of a ring with a ring inner side 21 and a ring outer side 22 and in which blades 23 are arranged on the ring inner side 21.

The rotors 20 of the two motors 10, 11 are arranged in the channel in the direction of flow of the fluid coaxially behind each other and with their respective ring outer side 22 supported by means of bearings 24 independently of each other in the same and in opposing directions around a common axis of rotation 25 rotatably in the housing 2. The main direction of flow 5 runs here in the direction of the axes of rotation 25 of the rotors 20. The motors 10, 11 are free of a component which runs through them along the axis of rotation of their respective rotors 20.

With both motors 10, 11 an exciter system 26 is arranged on the ring outer side 22 of the rotors 20 in each case which typically involves an arrangement of permanent magnets or a winding system which is arranged distributed in the circumferential direction of the rotor 20 on the ring outer side 22.

The two motors 10, 11 each comprise a stator 30 with a stator-side exciter system 31 with the stator 30 being arranged in the shape of a ring around the rotor 20 such that the stator-side exciter system 31 and the rotor-side exciter system 26 interoperate electromagnetically, so that the stator 30 along with the rotor 20 forms the electric motor 10 or 11.

The rotor 20 of the second motor 11 is able to be rotated independently of the rotor 20 of the first motor 10 in order to divert an outflow of the water caused by the first motor 10 which deviates from the main direction of flow 5 at least partly back into the main direction of flow 5.

The rotor 20 of the first electric motor 10 arranged first in the direction of flow must be controlled explicitly to impart a torque to the water for propelling the submarine 100. The loss-impaired spin of the outflow of the rotor 20 of the first motor 10, i.e. flow components of the water which deviate from the main direction of flow 5, can be diverted by the rotor 20 of the second motor 11 at least partly back into the main direction of flow 5 and thus converted into thrust.

Thus a diversion of the flow and hand at least partial torque compensation is effected by the rotor 20 of the second motor in 11. A diversion of the flow the components of the water deviating from the main flow direction 5 is for example possible by the rotor 20 of the second motor 11 being held stationary or being locked in a fixed position or by it being driven by the water flowing through the channel 3 or by it being driven electrically in the opposing direction to the rotor 20 of the first motor 10, i.e. that the two rotors contrarotate.

Figure 5:
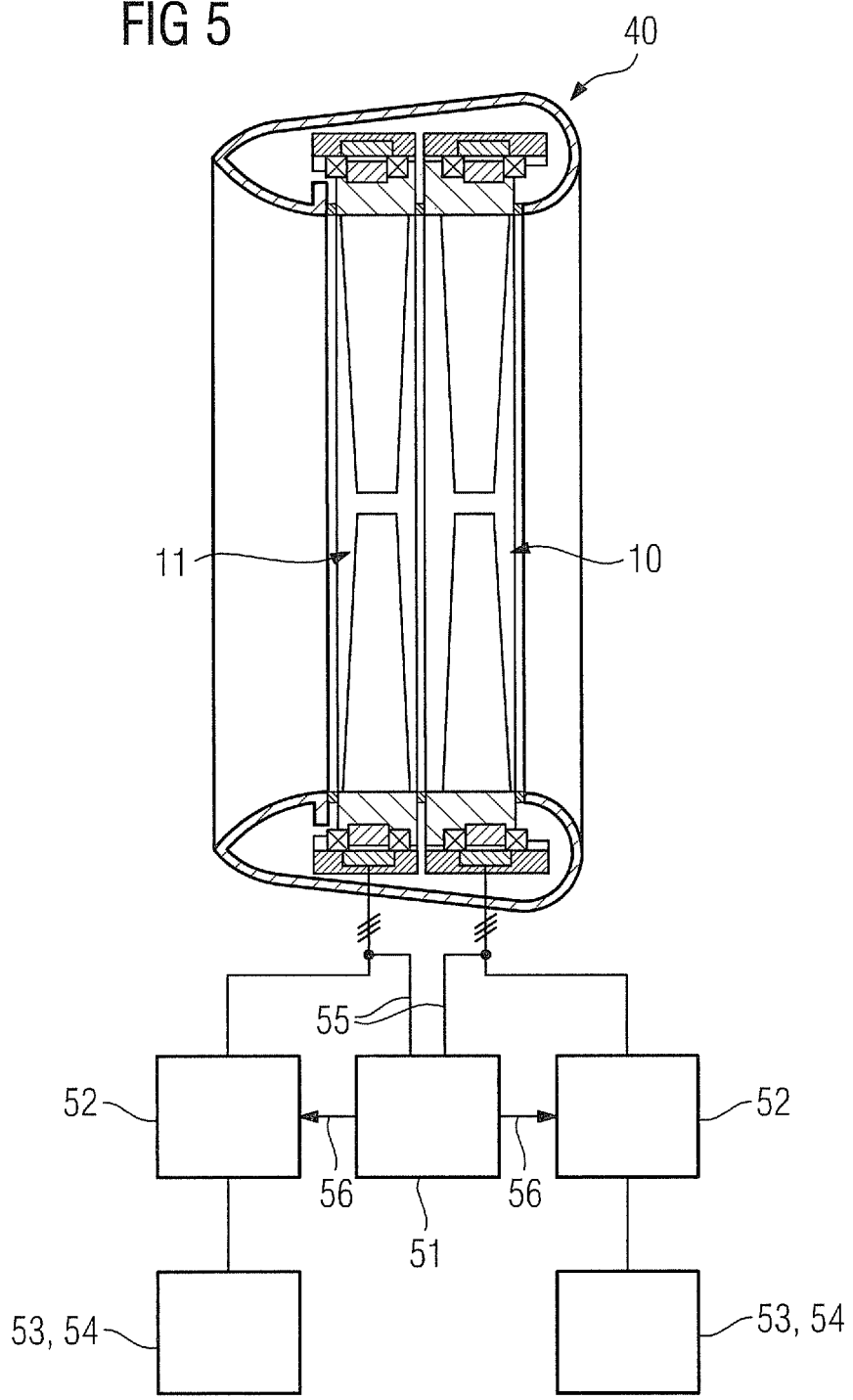
FIG. 5 a basic diagram of the propulsion drive of FIG. 3 and FIG. 4 and of the components to control its torque output, FIG. 6 a propulsion drive with one rotor with an additional support on the stern cone, FIG. 7 a propulsion drive with two rotors with an additional support on the stern cone.

As FIG. 5 shows for the case of the propulsion drive 40 of FIG. 3 and FIG. 4, in the event of this drive containing two motors 10, 11, a control device 51 for controlling the torque outputs of the motors 10, 11 such that the torques output by the motors 10, 11 are in a relationship to each other, particularly predetermined by the water dynamics.

To control the torque outputs each of the motors 10, 11 is connected electrically to a current converter 52 in each case. During motor operation each of the motors 10, 11 is fed via a respective current converter 52 from an energy source 53, e.g. a current generator or a fuel cell system or an energy store 54, e.g. a battery, with electrical current.

The control device 51 controls the torques of the motors 10, 11 and thus also the ratio of the torques of the two motors 10, 11 by controlling the current levels applied to the motors 10, 11. The control device 51 detects these current levels via signal lines 55 and controls the current converter 52 via control lines 56.

The ratio of the torques output by the motors 10, 11 is thus able to be varied during operation of the propulsion drive. This enables the ratio to be adapted to the general fluidic conditions and other operating parameters such as a desired operating mode of the propulsion drive 40 for example (e.g. thrust-optimized, speed-optimized, consumption-optimized, noise-optimized) and enables a desired operating point of the propulsion drive 40 to be set. To determine the torque ratio, characteristic curves or data records are stored in the control device 51 which describe the dependency of the torque ratio of the general fluidic conditions and the operating parameters (e.g. desired operating mode).

A further adaptation of the machine to changed general fluidic conditions is possible in that the pitch of the blades 23 is able to be changed.

The housing 2 of the propulsion drive 1, 40 can also be attached for example movably to the boat hull 101 by means of a suitable, possibly gimbal, attachment, horizontally and/or vertically in relation to the boat hull 101. The propellant flow of the propulsion drive 1, 40 can then be steered in different directions, by which the maneuverability of the submarine can be improved.

The propulsion drive 40 with two electric motors 10, 11 of FIG. 3-5 is preferably operated such that an outflow of the water caused by a rotor 20 of the first motor 10 which deviates from the main direction of flow 5 can be diverted by the rotor 20 of the second motor 11 at least partly back into the main direction of flow 5. To this end the following three modes of operation are available:

For silent running of the submarine only the rotor 20 of the first motor 10 is driven electrically. The rotor 20 of the second motor 11 on the other hand, e.g. by means of a brake not shown in greater detail, is held stationary or is locked in a fixed position.

When the submarine is traveling at cruising speed likewise only rotor 20 of the first motor 10 is electrically driven. The rotor 20 of the second motor 11 on the other hand is freely rotatable and is driven entirely or at least essentially by the water flowing through the channel 3 The rotor 20 of the second motor, with an appropriate design of the blades 23, can then assume the function of a Grim's guide wheel, which diverts flow components of the outflow of the rotor 20 of the first motor 10 deviating from the main direction of flow 5 and thus subject to losses, at least partly back into the main direction of flow 5. Alternatively the rotor 20 of the second motor in 11, depending on the hydrodynamic design of the second propeller as described above, can also be held in a fixed position or driven contrarotationally by the motor 11.

For traveling at high speed and/or at great depth the rotors 20 of the two motors 10, 11 are driven electrically in opposing directions so that they contrarotate and through the contrarotation cause a desired torque compensation.

Through this type of traveling regime the current consumption of the battery or of the fuel cell is set to its optimum and thereby the energy consumption minimized, by which the time that the submarine spends on the water or below it can be extended. At the same time the hydrodynamic design function is subject to fewer compromises since the surface load of the propellers for highest speed is reduced by the use of 2 propellers. At the same time the efficiency of the propulsion is increased.

With the submarine 100 shown in FIG. 1 and FIG. 3 the boat hull 101 runs at its rear end when seen in the direction of flow into a rounded-off stern part 104, which is frequently also referred to in technical jargon as a "stern cone" The submarine 100 features precisely one propulsion drive 1 or 40 which is arranged at the stern of the submarine 100 such that this stern cone 104 extends right into the inlet of the propulsion drive 1 or 40.

The size of the propulsion drive, its arrangement on the stern cone 104 and the shape of the stern 102 of the submarine 100, especially the shape of the stern cone, are matched to each other in such cases such that an even flow onto the propulsion drive is produced, through which a high efficiency of the propulsion drive can be achieved and simultaneously cavitation and undesired noises can be avoided.

The stern cone 104 in such cases is arranged in a line with the axis of rotation 25 of the rotor 20 or of the rotors 20 of the propulsion drive 1 or 40. The stern cone in such cases is embodied symmetrically around an axis, with its axis of symmetry running in a line with the axis of rotation 25 of the rotor 20 or of the rotors.

The stern cone 104 can however also extend through the propulsion drive 1 or 40.

Figure 6:
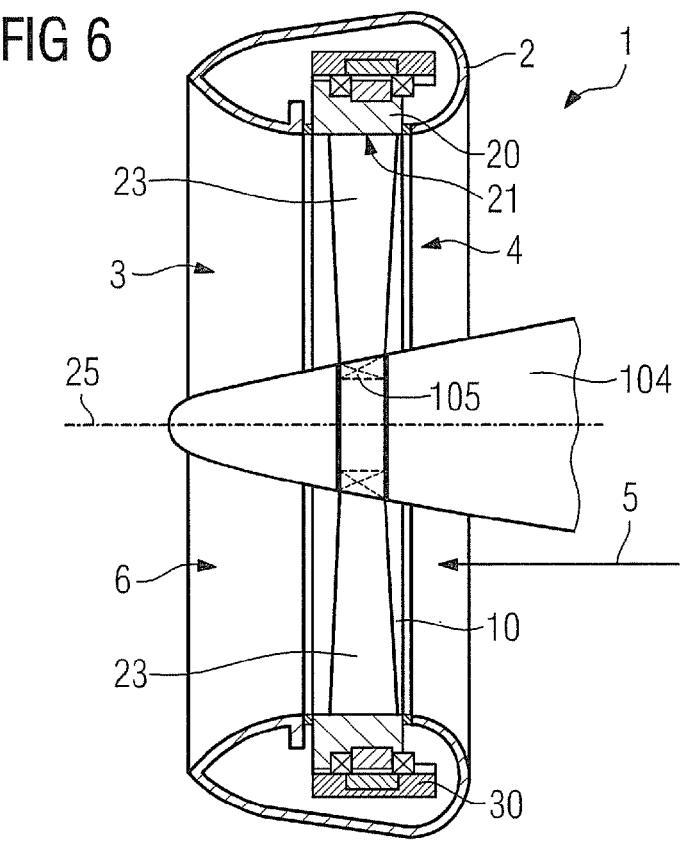

To illustrate this, FIG. 6 shows the propulsion drive of FIG. 2, but with the rotor 20 not only being supported rotatably by means of the bearing 24 in the housing 2, but additionally also being supported rotatably via the ends of the blades 23 by means of bearing 105 on the stern cone 104. The stability and thereby the power output of the propulsion drive 1 can be increased by this.

Figure 7:
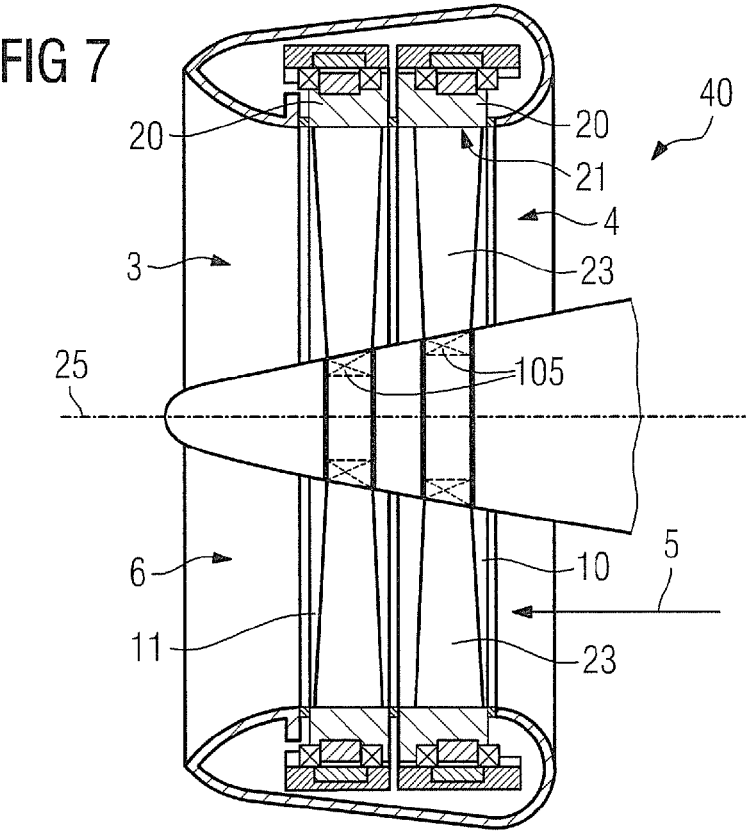

FIG. 7 shows a corresponding embodiment for the case of the propulsion drive 40 of FIG. 4.

The invention claimed is:

1. A submarine, comprising:
a boat hull including a stern; and
a propulsion drive arranged in the longitudinal direction of the submarine as an extension of the stern and outside the boat hull, the propulsion drive comprising:
  a housing forming a channel for a flow of water through the channel in a main direction of flow from an inlet to an outlet of the channel,
  a first electric motor including a rotor, which is arranged in the channel and supported rotatably around an axis of rotation in the housing, the rotor embodied in the shape of a ring with a ring inner side and a ring outer side, and
  a plurality of blades arranged on the ring inner side of the rotor of the first electric motor for propelling the submarine,
wherein the propulsion drive further comprises:
  a second electric motor including a rotor, which is arranged in the channel and supported rotatably in the housing, with the rotor being embodied in the form of a ring with a ring inner side and a ring outer side, and
  a plurality of blades being on the ring inner side of the rotor of the second electric motor,
wherein the rotor of the first electric motor and the rotor of the second electric motor are arranged in the channel in the main direction of flow of the water behind each other,
wherein the rotor of the first electric motor is rotated independently of the rotor of the second electric motor, in order to divert an outflow of the water caused by the rotor of the first electric motor which deviates from the main direction of flow at least partly back into the main direction of flow, and
wherein the rotors of the first and second electric motors are supported to enable them to rotate in opposite directions to each other in the housing.

2. The submarine as claimed in claim 1, wherein torque outputs of the first and second electric motors are independently controlled.

3. The submarine as claimed in claim 2, wherein the propulsion drive further comprises a control device for controlling the torque outputs of the first and second electric motors such that the torques outputs are in a predetermined relationship to each other.

4. The submarine as claimed in claim 3, wherein the control device controls the ratio of the torques by controlling or regulating current levels applied to the first and second electric motors.

5. The submarine as claimed in claim 1, wherein the housing is embodied in the shape of a nozzle.

6. The submarine as claimed in claim 1, wherein the housing of the propulsion drive is attached movably on the boat hull.

7. A submarine, comprising:
a boat hull including a stern; and
a propulsion drive arranged in the longitudinal direction of the submarine as an extension of the stern and outside the boat hull, the propulsion drive comprising:
  a housing forming a channel for a flow of water through the channel in a main direction of flow from an inlet to an outlet of the channel,
  a first electric motor including a rotor, which is arranged in the channel and supported rotatably around an axis of rotation in the housing, the rotor embodied in the shape of a ring with a ring inner side and a ring outer side, and
  a plurality of blades arranged on the ring inner side of the rotor of the first electric motor for propelling the submarine,
wherein the propulsion drive further comprises:
  a second electric motor including a rotor, which is arranged in the channel and supported rotatably in the housing, with the rotor being embodied in the fowl of a ring with a ring inner side and a ring outer side, and
  a plurality of blades being on the ring inner side of the rotor of the second electric motor,
wherein the rotor of the first electric motor and the rotor of the second electric motor are arranged in the channel in the main direction of flow of the water behind each other,
wherein torque outputs of the first and second electric motors are independently controlled,
wherein the propulsion drive further comprises a control device for controlling the torque outputs of the first and second electric motors such that the torques outputs are in a predetermined relationship to each other, and
wherein the control device controls the ratio of the torques by controlling or regulating current levels applied to the first and second electric motors.

8. The submarine as claimed in claim 7, wherein the rotor of the first electric motor is rotated independently of the rotor of the second electric motor, in order to divert an outflow of the water caused by the rotor of the first electric motor which deviates from the main direction of flow at least partly back into the main direction of flow, and
wherein the rotors of the first and second electric motors are supported to enable them to rotate in opposite directions to each other in the housing.

9. The submarine as claimed in claim 7, wherein the housing is embodied in the shape of a nozzle.

10. The submarine as claimed in claim 7, wherein the housing of the propulsion drive is attached movably on the boat hull.

11. A submarine, comprising:
a boat hull including a stern; and
a propulsion drive arranged in the longitudinal direction of the submarine as an extension of the stern and outside the boat hull, the propulsion drive comprising:

a housing footing a channel for a flow of water through the channel in a main direction of flow from an inlet to an outlet of the channel, a first electric motor including a rotor, which is arranged in the channel and supported rotatably around an axis of rotation in the housing, the rotor embodied in the shape of a ring with a ring inner side and a ring outer side, and a plurality of blades arranged on the ring inner side of the rotor of the first electric motor for propelling the submarine, wherein the housing of the propulsion drive is attached movably on the boat hull, wherein the propulsion drive further comprises:

a second electric motor including a rotor, which is arranged in the channel and supported rotatably in the housing, with the rotor being embodied in the form of a ring with a ring inner side and a ring outer side, and a plurality of blades being on the ring inner side of the rotor of the second electric motor, wherein the rotor of the first electric motor and the rotor of the second electric motor are arranged in the channel in the main direction of flow of the water behind each other, wherein torque outputs of the first and second electric motors are independently controlled, wherein the propulsion drive further comprises a control device for controlling the torque outputs of the first and second electric motors such that the torques outputs are in a predetermined relationship to each other, and wherein the ratio of the torques output during the operation of the electric motors is adjustable.

12. The submarine as claimed in claim 11, wherein the housing is embodied in the shape of a nozzle.

* * * * *